United States Patent [19]

Kollmeier et al.

[11] 4,139,503
[45] Feb. 13, 1979

[54] PROCESS FOR THE PRODUCTION OF HIGH RESILIENCE POLYURETHANE FOAMS AND FOAMS PRODUCED THEREFROM

[75] Inventors: Hans-Joachim Kollmeier, Essen; Gerd Rossmy, Haltern, both of Fed. Rep. of Germany

[73] Assignee: Th. Goldschmidt AG, Essen, Fed. Rep. of Germany

[21] Appl. No.: 825,420

[22] Filed: Aug. 17, 1977

[30] Foreign Application Priority Data

Aug. 23, 1976 [GB] United Kingdom ............... 35075/76

[51] Int. Cl.$^2$ ............................................... C08J 9/00
[52] U.S. Cl. .................................... 521/112; 521/174; 521/904
[58] Field of Search ................................. 260/2.5 AH

[56] References Cited

U.S. PATENT DOCUMENTS

| | | | |
|---|---|---|---|
| 3,741,917 | 6/1973 | Morehouse | 260/2.5 AH |
| 4,038,221 | 7/1977 | Koster et al. | 260/2.5 AH |
| 4,042,540 | 8/1977 | Lammerting et al. | 260/2.5 AH |

FOREIGN PATENT DOCUMENTS 238213  7/1959 Australia ............................. 260/2.5 AH Primary Examiner—Lewis T. Jacobs
Attorney, Agent, or Firm—Toren, McGeady and Stanger

[57] ABSTRACT

A process for the production of high resilience, open celled polyurethane foams which do not shrink in storage using conventional and readily available polyisocyanates and polyoxyalkylene polyols wherein from 0.01 to 2.0 g/100 g of polyol of specific siloxane components are added to the foaming charge. Foams produced by the process are also disclosed.

9 Claims, No Drawings

PROCESS FOR THE PRODUCTION OF HIGH RESILIENCE POLYURETHANE FOAMS AND FOAMS PRODUCED THEREFROM

BACKGROUND OF THE INVENTION

1. Field of the Invention

The invention concerns a process for the production of high resilience, open celled foams containing urethane groups from polyether polyols, polyisocyanates, water, catalysts, emulsifiers or stabilizers, cross-linking agents and, if necessary, organic blowing agents.

The invention particularly concerns a process for the production of highly flexible polyurethane foams (so-called high-resilience foams) by using, as raw materials, polyether polyols composed exclusively of alkylene oxides and toluylene diisocyanates which are customary in the production of urethane foams.

2. Description of the Prior Art

Flexible polyurethane foams are widely used in the upholstery industry. The object in the development of these foams was to reproduce the physical properties of natural latex foams. Those polyurethane foams which are technically referred to as high resilience polyurethane foams come closest to the physical properties of latex foams. They are characterized in their physical properties, as compared to the conventional flexible polyurethane foams, in that their force-deformation characteristics have no plateau, the quotient of compression hardness at 65 and 25% deformation is over 2.4, and their resilience should be over 50%.

High resilience foams with these properties have already been described in the literature. However, the problems encountered in the production of these foams have greatly limited the amount of this material produced commercially.

Technically, it is desirable to produce the foams in continuous blocks or in molds according to the so-called "one shot method". Such foams should not sag or shrink after rising in the curing stage. In order to achieve this goal, it is necessary that the cells of such foams at least partly open after rising without mechanical action. This can be frequently recognized by the fact that the foams blow off. Additionally, it is desirable that foams can be produced according to a given process with a wide variability in their density, for example, slabstock foams with densities between 18 and 50 kg/cu m and molded foams with densities between 30 and 80 kg/cu m.

Attempts to produce such high resilience polyurethane foams in these density ranges with conventional polyols and toluylene diisocyanates in a manner such that their cell windows open after rising, have been only partly successful. Most of the methods suggested for the production of high resilience foams have the disadvantage that the cell windows of the foams do not open or open insufficiently after rising so that the foams shrink after curing. The shrinkage can be avoided by compressing the foams shortly after rising, so that the cell walls of the foams are mechanically ruptured. This procedure has serious drawbacks, particularly, in the case of low densities, since the physical properties of the foams are substantially impaired by tearing in the incompletely cured state.

Foams with the desired properties according to the state of the art have been successfully prepared by modifying the raw materials required for foaming.

Thus, for example, it is known from DOS No. 2,242,476 and U.S. Pat. No. 3,383,351 to use modified polyether polyols which contain grafted organic polymeric side chains instead of the conventional polyether polyols. These side chains can be obtained by radically induced grafting of styrene and/or acrylonitrile. A detailed description of this procedure is found in the above mentioned DOS No. 2,242,476.

Another solution is disclosed in DOS No. 2,221,811 and DOS No. 2,232,525. According to these patents, modified isocyanate components are used which are essentially isocyanates containing isocyanuric acid rings or biuret, allophanate- and/or urethane groups.

The use of special modified polyether polyols or modified isocyanates necessarily leads to an increase in the cost of the product. For the foam manufacturer, it is still desirable, in practice, to produce high-resilience polyurethane foams from conventional polyether polyols, that is, polyether polyols composed exclusively of alkylene oxides, and diisocyanates, which are available to the processor as the most economical raw materials for the production of polyurethane foams.

SUMMARY OF THE INVENTION

The invention is directed to the problem of developing a process for the production of high resilience polyurethane foams which permits the foaming of conventional polyether polyols by reacting them with pure toluylene diisocyanate, which is, technically, the most readily available material, and, particularly, the 2,4- and 2,6- isomer mixture in a weight ratio of 80:20.

It was found surprisingly that this could be achieved if the production of foams from conventional polyether polyols and toluylene diisocyanate is effected in the presence of certain selected silicones and cross-linking agents.

The process of the invention thus prescribes the use of a certain combination of siloxanes and cross-linking agents in the manufacture of high resilience foams.

Specifically, the process according to the invention is that in addition to the usual components of the mixture to be foamed, the following components are added:

(A) 0.01 to 2.0 g/100 g polyol of siloxane components are added selected from the group of:

(A-1) a straight-chained or branched, fractioned organopolysiloxane which represents a mixture of polysiloxanes with 7 to 20 Si-atoms, where the Si-valences that are not linked through oxygen with silicon are saturated with lower and, if necessary, substituted alkyl radicals and/or aryl radicals, where the terminal Si-atoms can have a low alkoxy group; or (A-2) known polyoxyalkylene-polysiloxane-block copolymers whose siloxane block corresponds to the definition under A-1), but where the alkoxy radical(s) have been substituted by polyether blocks with an average molecular weight of under 1500; or (A-3) known straight-chained or branched organopolysiloxanes, where the siloxane block or -blocks are substantially in statistical equilibrium, and each block has, on the average, 5 to 15 Si-atoms and at least one substituted alkyl group or an alkyl aryl group is contained in each siloxane block; or (A-4) known polyoxyalkylene-polysiloxane-block copolymers where the siloxane block or -blocks are substantially in statistical equilibrium, and each block contains on the average, 5 to 15 Si-atoms, and wherein 2 to 6 polyoxyalkylene blocks with an average molecular weight of under 1500 are contained in each siloxane block; and (B) 0.01 to 0.2 g hydroxy equivalent weight/100 g polyol of a cross-linking agent are added which contain at least 4 hydroxyl groups per molecule and has a hydroxy equivalent weight of 30 to 180.

DESCRIPTION OF THE PREFERRED EMBODIMENTS

Polysiloxanes A-1 are a fraction of polysiloxanes with 7 to 20 Si-atoms. That is to say, a siloxane mixture where the portion with less than 7 and more than 20 Si-atoms have been separated. The separation is effected in known manner, for example, by distillation. Examples of siloxanes that are within the A-1 definition are methyl polysiloxanes, methylphenyl polysiloxanes, as well as other siloxanes with lower alkyl radicals. The term alkyl radicals as used herein means alkyl radicals with 1 to 4 C-atoms. If the polysiloxanes contain terminal alkoxy groups, the alkoxy groups are likewise derived from lower alcohols with 1 to 4 C-atoms.

The polysiloxanes according to A-1) must be fractionated, since polyorganosiloxanes, which contain on the average 7 to 20 Si-atoms and whose molecular weight distribution is a statistical equilibrium, have an increasing defoaming or antifoaming effect due to that portion of molecules with over 20 Si-atoms and particularly over 30 Si-atoms (in the above described foam systems.) As a practical matter, the upper limit of 20 Si-atoms is approximate in that distilled portions with chain lengths of 20 to 25 Si-atoms can be still present in the fraction. The portion of non-volatile constituents in the entire mixture, however, should be less than 0.5% by weight.

Siloxanes with chain lengths of 2 to 6 Si-atoms are ineffective or of little effectiveness in the foaming mixtures, however, they have no adverse effect. It is therefore preferred, but not absolutely necessary, to separate these portions from the siloxane mixture to be used according to the invention. Preferred polysiloxanes according to A-1) are linear polydimethyl siloxanes.

The polysiloxanes of class A-2 are polyoxyalkylene-polysiloxane-block copolymers whose polysiloxane-block or -blocks represent, likewise, a fractional mixture with 7 to 20 Si-atoms per siloxane block. The polyoxyalkylene radical has a molecular weight of less than 1500. The ratio of ethylene oxide to propylene oxide in the polyoxalkylene blocks can be between 20:80 to 80:20. They thus differ from the polysiloxanes according to A-1 in that the alkoxy group(s) have been substituted by one or more polyoxylalkylene blocks.

The polysiloxanes of class A-3) contain, as a polysiloxane block or polysiloxane blocks, equilibrated organopolysiloxanes. That is, polysiloxanes whose molecular weight distribution corresponds substantially to the statistical equilibrium and are not fractionated, in contrast to the above mentioned polysiloxanes. On the average, each polysiloxane block contains 5 to 15 Si-atoms. They contain, per siloxane block, on the average at least one, and preferably, up to 6 substituted alkyl groups, such as, the 3-cyanopropyl-, 3-chloropropyl- or 3-cyanopropylpropoxy group, or alkylaryl groups, like the ethylphenyl groups. The valences of the Si-atoms which are not linked with oxygen are saturated with low alkyl-, and/or aryl-radicals, and preferably methyl radicals.

The polyoxyalkylene-polysiloxane-block copolymers of class A-4) contain as a polysiloxane block or polysiloxane blocks, equilibrated organopolysiloxanes. That is, organopolysiloxane whose molecular weight distribution corresponds substantially to the statistical equilibrium and are not fractionated, in contrast to the above-mentioned polysiloxanes under class A-1. On the average each polysiloxane block contains 5 to 15 Si-atoms. The block copolymer should contain 2 to 6 polyoxyalkylene-blocks of the above definition given for A-2 per siloxane blocks. The valances of the Si-atoms which are not linked with oxygen are saturated with low alkyl -and/or aryl radicals, preferably methyl radicals.

The structure and the production of the polyether-polysiloxane copolymers according to A-2) and A-4) are well known to the man skilled in the art. The siloxane blocks can be linear or branched and can be linked with the polyoxyalkylene blocks over SiOC- or over SiC bonds. A detailed representation of the structure and production of these products is found, for example, in a "Block Copolymers" by D. G. Allport and W. H. Ianes, Applied Science Publishers Ltd. London 1973, p. 305 ff. The production of the siloxanes according to A-3) with cyanoalkyl- and alkaryl groups is shown in DOS No. 2,356,443 and DOS No. 2,402,691.

The siloxanes A-1), A-2), A-3) or A-4) are added to the foaming charge in amounts of 0.01 to 2.0 g/100 g polyol in known manner. They can be added separately to the mixing head or in mixture with the polyether or with the water - or water-amine solution.

The cross-linking component B) is characterized in two ways; on the one hand, it should contain at least 4 OH groups per molecule; on the other hand, its hydroxy equivalent weight should be 30 to 180.

The term hydroxy equivalent weight means, numerically, the molecular weight divided by the number of hydroxyl groups in the molecule. In a polyfunctional molecule, the hydroxy-equivalent weight corresponds to the weight of the molecule divided by the number of hydroxyl groups contained in the molecule. The hydroxy-equivalent weight of the cross-linking agent to be used according to the invention is preferably 30 to 100.

Examples of preferred cross-linking agents are sorbitol, mannite, xylite, glucose, sucrose, as well as partial carboxylic esters or alkyl ethers of the above mentioned compounds. Also included are the decomposition products and derivatives of starch and cellulose which are soluble in water and/or dispersible in polyether polyols. Examples of suitable decomposition products are the dextrins, which can be obtained by acid hydrolysis or by thermal dissociation of starch. Examples of derivatives of starch or cellulose are hydroxyethyl-starches or hydroxymethyl celluloses.

The amount of cross-linking agent to be added to the foaming charge is determined essentially by the number of hydroxyl groups contained in the molecule of the cross-linking agent. The amount in grams can be calculated by multiplying the hydroxy-equivalent weight by the factor 0.01 to 0.2 and using the amount thus obtained per 100 g polyol. The amount to be used is thus 0.01 to 0.2 g · hydroxy-equivalent weight /100 g polyol. If the hydroxy equivalent weight is 30, for example, 0.3 to 6.0 g of this cross-linking agent must be added to the foaming charge.

If the cross-linking agent which is to be used, e.g., sorbitol, is sufficiently soluble in water, it can be added in a water solution or in the water-amine-activator mixture. Cross-linking compounds, such as, starch or its derivatives, which are not soluble in water, can be pre-dispersed in the polyether polyol to be used for foaming and can be added in this form.

It was found particularly advantageous to add to the reaction charge, in addition to the combination of the siloxane component and cross-linking agent according to the invention, urea in an amount of 0.05 to 1.0 g/100 g polyol, and preferably 0.2 to 0.5 g/100 g polyol. The addition of urea has the effect that the opening of the cells of the foam formed is facilitated. Normally the escape of gas from the polyurethane foam block is observed toward the end of the formation of the polyurethane foam. This gas-escape is termed "blowoff" and is an indication that the cells are open or that shrinkage of the foam on cooling is not likely.

As mentioned above, as a requirement for the process according to the invention, polyols composed exclusively of alkylene oxides with at least two hydroxyl groups per molecule and a hydroxy-equivalent weight of 1000 to 4000, and particularly 1500 and 3000, which contain at least 5 to 20% by weight polyoxyethylene groups and at least 10 mol%, preferably more than 30 mol%, primary hydroxyl groups, can be used as polyether polyols. The production of the polyether polyols is effected by preferably adding ethylene oxide and propylene oxide on polyvalent alcohols or amines.

As the conventional diisocyanate can be used the customary distilled toluylene diisocyanate, preferably with an isomer ratio of its 2.4 and 2.6 isomers of 80/20. It is naturally also possible to add to this toluylene diisocyanate other isocyanates if necessary, such as 4,4-diphenylmethane diisocyanate, but the use of pure toluylene diisocyanate is preferred. Details about the conventional polyether polyols, toluylene diisocyanates and other polyisocycanates, which are normally used for the production of flexible polyurethane foams according to the state of the art, can be read from the Plastic Handbook vol. VIII "Polyurethanes" by R. Vieweg and A. Hoechtlen, Publ. by Carl Hanser, Munich 1966; and from DOS No. 2,507,161.

In order to obtain a favorable reaction time for foaming, catalysts are generally added to the polyurethane foaming charge. The catalysts to be used in the process according to the invention are those which are most frequently used in the production of flexible polyether polyurethane foams, according to the state of the art like tertiary amines, preferably triethylene diamine, dimethylethanol amine, bis-(dimethyl-aminoethyl-)ether, and N-alkyl morpholines, and organic metal compounds, preferably organic tin compounds, like tin (II) octoate and dibutyl tin dilaurate.

To the foaming mixture can also be added known low-molecular cross-linking agents with 2 or 3 hydroxyl groups per molecule, such as, di- or triethanol amine or glycerin, as well as organic blowing agents, fire-retardant agents, and if necessary, non-siliceous organic emulsifiers.

A summarizing representation of catalysts, organic blowing agents, fire-retardant agents and emulsifiers, which are used in the production of flexible polyether-polyurethane foams is found in the above mentioned reference book "Plastic Handbook of Polyurethanes".

The process according to the invention is thus a process which leads to high resilience, open celled polyurethane foam by using the technically most readily accessible raw materials and known technically customary additives, where certain known siloxane compounds and cross-linking agents, as well as additional urea are combined in certain selected amounts and ratios, which are of great technical interest and could not be obtained heretofore with these raw materials.

The high resilience polyurethane foams obtained according to the invention can be produced in a density range between 18 and 50 kg/cu m open as blocks or between 30 and 80 kg/cu m in molds. The foams show, after foaming and curing no signs of sagging or shrinking. Their physical properties characterize them as high resilience polyurethane foams.

The process according to the invention will be described more fully on the basis of the following examples. The physical properties mentioned in the examples were determined according to the test specifications DIN 53 577 (compression hardness), DIN 53 571 (elongation and tensile strength) and DIN 53 572 (compression set).

EXAMPLE 1

The following mixture is prepared 100.00 parts by weight of a polyoxyalkylene-triol started with glycerin, which is composed of 84% by weight propylene oxide and 16% by weight ethylene oxide and which has a hydroxy-equivalent weight of 1600.

3.00 parts by weight water 0.13 parts by weight triethylene diamine 0.10 parts by weight bis-(dimethylaminoethyl)-ether 0.50 parts by weight diethanol amine 1.35 parts by weight sorbitol (added as 70% solution in water)

0.40 parts by weight urea (added as 50% solution in water)

0.04 parts by weight polydimethyl siloxane, consisting of 99.8% of a mixture of siloxanes with 8 to 16 Si-atoms substantially in statistical distribution 0.15 parts by weight tin (II) octoate.

This mixture is premixed and thereafter stirred intensively with 39.8 parts by weight of toluylene diisocyanate (80/20 2,4/2,6 isomer mixture TDI 80/20) in a 500 ml beaker for 7 seconds and then placed in an open cabinet. A foam body is formed which blows off after a rising time of 110 sec., is open-celled, does not shrink in storage, and has the following mechanical properties:

| | | |
|---|---|---|
| density (kg/cu m) | | 29 |
| tensile strength (kg/cm$^2$) | | 0.9 |
| elongation (%) | | 140 |
| resilience (%) | | 65 |
| compression hardness (g/cm$^2$) | at 40% | 19 |
| | at 25% | 16 |
| | at 65% | 43 |
| 65/25 % quotient | | 2.7 |
| compression set 85% (%) | | 6 |

Foaming charges which have the above composition but where the content of tin (II) octoate is varied between 0.1 to 0.2 parts by weight, yield blowing-off, open-celled, non-shrinking foams. This demonstrates the wide latitude in the formulation as far as the catalyst content is concerned.

Comparison examples (a) A mixture having the above-mentioned composition, but with the difference that no sorbitol is added, is reacted with 35.9 parts by weight TDI 80/20 in the same manner. The foam formed collapses after 70 seconds.

(b) A foaming charge having the composition indicated in example 1 but with the difference that no polydimethyl siloxane is added, yields a foam which does not blow off and which greatly shrinks in storage.

(c) A foaming charge with the composition indicated in example 1 but with the difference that a polydimethyl siloxane is added at which 95% represents a mixture of siloxanes with 2 to 7 Si-atoms, yields a foam which blows off very little and shrinks moderately in storage.

(d) A foaming charge with the composition indicated in example 1 but with the difference that no urea is added, yields a foam which blows off less than the foam in example 1 and sags slightly at the upper edges. The physical properties of the foam are identical with the foam in example 1.

EXAMPLE 2

The following mixture was prepared:
100.00 parts by weight of the polyetherpolyol mentioned in example 1
2.20 parts by weight water
0.035 parts by weight triethylene diamine
0.20 parts by weight bis-(dimethylaminoethyl-)ether
0.30 parts by weight diethanolamine
1.00 parts by weight sorbitol
0.30 parts by weight urea
0.04 parts by weight of the polysiloxane mentioned in example 1
0.15 parts by weight tin (II) octoate.

This mixture is stirred intensively for 7 seconds with 33.0 parts by weight TDI 80/20 and subsequently placed in an open cabinet lined with paper. A foam is formed which blows off at the end of its rising time after 120 seconds, is open-celled and does not shrink in storage. Its mechanical properties are:

| density (kg/cu m) | | 40 |
|---|---|---|
| tensile strength (kp/sq.cm) | | 1.0 |
| elongation (%) | | 130 |
| resilience (%) | | 65 |
| compression hardness (g/cm$^2$) | at 40% | 30 |
| | at 25% | 25 |
| | at 65% | 73 |
| 65/25% quotient | | 2.9 |
| compression set 35% (%) | | 5 |

EXAMPLE 3

The following mixture was prepared:
100.00 parts by weight of the polyether polyol mentioned in example 1
2.70 parts by weight water
0.13 parts by weight triethylene diamine
0.10 parts by weight bis-(dimethylaminoethyl)-ether
1.00 parts by weight diethanolamine
1.35 parts by weight sorbitol
0.40 parts by weight urea
0.04 parts by weight of the polysiloxane mentioned in example 1
0.20 parts by weight tin (II) octoate
13.00 parts by weight trichlorofluoromethane.

The mixture is reacted with 37.5 parts by weight TDI 80/20 similar to example 1. A foam is formed which blows off at the end of the rising time, is open-celled, and does not shrink in storage. Its mechanical properties are

| density (kg/cu m) | | 22 |
|---|---|---|
| tensile strength (kg/sq.cm) | | 0.6 |
| elongation (%) | | 130 |
| resilience (%) | | 65 |
| compression hardness (g/cm$^2$) | at 40% | 10 |
| | at 25% | 8 |
| | at 65% | 21 |
| 65/25% quotient | | 2.6 |
| compression set 85% (%) | | 8 |

EXAMPLE 4

A mixture of the composition mentioned in example 1, but with the difference that instead of the fractionated polydimethyl siloxane, 0.1 parts of weight of a polyether-polysiloxane-copolymer is used, is reacted with 39.8 parts by eight TDI 80/20 in an open cabinet. The polyether polysiloxane copolymer consists of two polyether blocks with a mean molecular weight of 700 and an ethylene/propylene-oxide ratio of 35/65, as well as an equilibriated polydimethyl siloxane block with a mean chain length of 6.0 Si-atoms.

The foam formed blows after rising, is open-celled, and does not shrink in storage. Its physical properties are almost identical with those of the foam in example 1.

EXAMPLE 5

The following mixture was prepared:
100.00 parts by weight of the polyether polyol mentioned in example 1
3.00 parts by weight water
0.13 parts by weight triethylene diamine
0.10 parts by weight bis-(dimethylaminoethyl)-ether
0.50 parts by weight diethanolamine
3.00 parts by weight starch (predispersed in polyether polyol)
0.04 parts by weight of the polysiloxane mentioned in example 1
0.15 parts by weight tin (II) octoate.

The mixture was foamed with 41.8 parts by weight TDI 80/20, as in example 1. A foam is formed which blows off after a rinsing time of 108 seconds, is open-celled, and does not shrink in storage. Its physical properties are similar to the foam in example 1, with the difference that the values for the compression hardnesses are by about 20 to 25% higher.

What is claimed is:

1. In a process for the production of high-resilience open-celled polyurethane foams in one step wherein a foaming charge containing polyether polyols composed essentially of alkylene oxides, polyisocyanates, water, catalysts, emulsifiers or stabilizers, cross-linking agents and conventional additives, is formed, the improvement which comprises adding the followig ingredients to the foaming charge:

(A) 0.01 to 2.0 g/100 g polyol of a siloxane component selected from the group consisting of:
(A-1) straight-chained or branched, fractional organopolysiloxane composed of a mixture of polysiloxanes with 7 to 20 Si-atoms, where the Si-valences which are not linked through oxygen with silicon, are saturated with lower alkyl radicals or aryl radicals, where the terminal Si-atoms can have a lower alkoxy group attached thereto;

(A-2) known polyoxyalkylene-polysiloxane-block copolymers, whose siloxane block corresponds to the definition under A-1, but wherein the alkoxy radicals have been replaced by polyether blocks with an average molecular weight of less than 1500;

(A-3) known straight-chained or branched organopolysiloxanes, wherein the siloxane block or blocks are substantially in statistical equilibrium, each block having on the average, 5 to 15 Si-atoms and containing at least one substituted alkyl group or an alkylaryl group per siloxane block; and (A-4) known polyoxyalkylene-polysiloxane-block copolymers, wherein the siloxane block or -blocks are substantially in statistical equilibrium and each block has on the average, 5 to 15 Si-atoms and contains attached thereto 2 to 6 polyoxyalkylene blocks with an average molecular weight of less than 1500; and (B) 0.01 to 0.2 g-hydroxy equivalent weight /100 g polyol of a cross-linking agent having at least 4 hydroxyl groups per molecule and a hydroxy equivalent weight of 30 to 180 and wherein toluylene di-isocyanate is the polyisocyanate.

2. The process of claim 1, wherein siloxane component A-1 are linear polydimethyl siloxanes.

3. A high-resilience polyurethane foam produced by the process of claim 1.

4. The foam of claim 3 in the form of open blocks having a density in the range from 18 to 50 kg/m$^3$.

5. The foam of claim 3 cast in molds and having a density range between 30 to 80 kg/m$^3$.

6. In a process for the production of high-resilience open-celled polyurethane foams in one step wherein a foaming charge containing polyether polyols composed essentially of alkylene oxides, polyisocyanates, water, catalysts, emulsifiers or stabilizers, cross-linking agents and conventional additives, is formed, the improvement which comprises adding the following ingredients to the foaming charge:

(A) 0.01 to 2.0 g/100 g polyol of a siloxane component selected from the group consisting of:

(A-1) straight-chained or branched, fractional organopolysiloxane composed of a mixture of polysiloxanes with 7 to 20 Si-atoms, where the Si-valences which are not linked through oxygen with silicon, are saturated with lower alkyl radicals or aryl radicals, where the terminal Si-atoms can have a lower alkoxy group attached thereto;

(A-2) known polyoxyalkylene-polysiloxane-block copolymers, whose siloxane block corresponds to the definition under A-1, but wherein the alkoxy radicals have been replaced by polyether blocks with an average molecular weight of less than 1500;

(A-3) known straight-chained or branched organopolysiloxanes, wherein the siloxane block or blocks are substantially in statistical equilibrium, each block having on the average, 5 to 15 Si-atoms and containing at least one substituted alkyl grup or an alkylaryl group per siloxane block; and (A-4) known polyoxyalkylene-polysiloxane-block copolymers, wherein the siloxane block or blocks are substantially in statistical equilibrium and each block has on the average, 5 to 15 Si-atoms and contains attached thereto 2 to 6 polyoxyalkylene blocks with an average molecular weight of less than 1500; and (B) 0.01 to 0.2 g-hydroxy equivalent weight/100 g polyol of a cross-linking agent having at least 4 hydroxyl groups per molecule and a hydroxy equivalent weight of 30 to 180, and wherein urea is added to the foaming charge in an amount of 0.05 to 1.0 g/100 g polyol.

7. The process according to claim 6 wherein urea is added to the foaming charge in an amount of 0.2 to 0.5 g/100 g polyol.

8. In a process for the production of high-resilience open-celled polyurethane foams in one step wherein a foaming charge containing polyether polyols composed essentially of alkylene oxides, polyisocyanates, water, catalysts, emulsifiers, or stabilizers, cross-linking agents and conventional additives, is formed, the improvement which comprises adding the following ingredients to the foaming charge:

(A) 0.01 to 2.0 g/100 g polyol of a siloxane component selected from the group consisting of:

(A-1) straight-chained or branched, fractional organopolysiloxane composed of a mixture of polsiloxanes with 7 to 20 Si-atoms; where the Si-valences which are not linked through oxygen with silicon, are saturated with lower alkyl radicals or aryl radicals, where the terminal Si-atoms can have a lower alkoxy group attached thereto;

(A-2) known polyoxyalkylene-polysiloxane-block copolymers, whose siloxane block corresponds to the definition under A-1, but wherein the alkoxy radicals have been replaced by polyether blocks with an average molecular weight of less than 1500;

(A-3) known straight-chained or branched organopolysiloxanes, wherein the siloxane block or blocks are substantially in statistical equilibrium, each block having on the average, 5 to 15 Si-atoms and containing at least one substituted alkyl group or an alkylaryl group per siloxane block; and (A-4) known polyoxyalkylene-polysiloxane-block copolymers, wherein the siloxane block or blocks are substantially in statistical equilibrium and each block has on the average, 5 to 15 Si-atoms and contains attached thereto 2 to 6 polyoxyalkylene blocks with an average molecular weight of less than 1500; and (B) 0.01 to 0.2 g-hydroxy equivalent weight/100 g polyol of sorbitol as a cross-linking agent.

9. In a process for the production of high-resilience open-celled polyurethane foams in one step wherein a foaming charge containing polyether polyols composed essentially of alkylene oxides, polyisocyanates, water, catalysts, emulsifiers, or stabilizers, cross-linking agents and conventional additives, is formed, the improvement which comprises adding the following ingredients to the foaming charge;

(A) 0.01 to 2.0 g/100 g polyol of a siloxane component selected from the group consisting of:

(A-1) straight-chained or branched, fractional organopolysiloxane composed of a mixture of polysiloxanes with 7 to 20 Si-atoms, where the Si-valences which are not linked through oxygen with silicon, are saturated with lower alkyl radicals or aryl radicals, where the terminal Si-atoms can have a lower alkoxy group attached thereto;

(A-2) known polyoxyalkylene-polysiloxane-block copolymers, whose siloxane block corresponds to the definition under A-1, but wherein the alkoxy radicals have been replaced by polyether blocks with an average molecular weight of less than 1500;

(A-3) known straight-chained or branched organopolysiloxanes, wherein the siloxane block or blocks are substantially in statistical equilibrium, each block having on the average, 5 to 15 Si-atoms and containing at least one substituted alkyl group or an alkylaryl group per siloxane block; and (A-4) known polyoxyalkylene-polysiloxane-block copolymers, wherein the siloxane block or blocks are substantially in statistical equilibrium and each block has on the average, 5 to 15 Si-atoms and contains attached thereto 2 to 6 polyoxyalkylene blocks with an average molecular weight of less than 1500; and (B) 0.01 to 0.2 g·hydroxy equivalent weight/100 g polyol of a cross-linking agent having at least 4 hydroxyl groups per molecule and a hydroxy equivalent weight of 30 to 180, and wherein the polyisocyanate is a mixture of the 2,4- and 2,6-isomers of toluylene di-isocyanate in a ratio of 80:20, respectively.

* * * * *